F. D. SILLOWAY.
STEAM ESCAPE FIXTURE FOR MACHINE GUN WATER JACKETS.
APPLICATION FILED DEC. 21, 1918.
1,294,349. Patented Feb. 11, 1919.
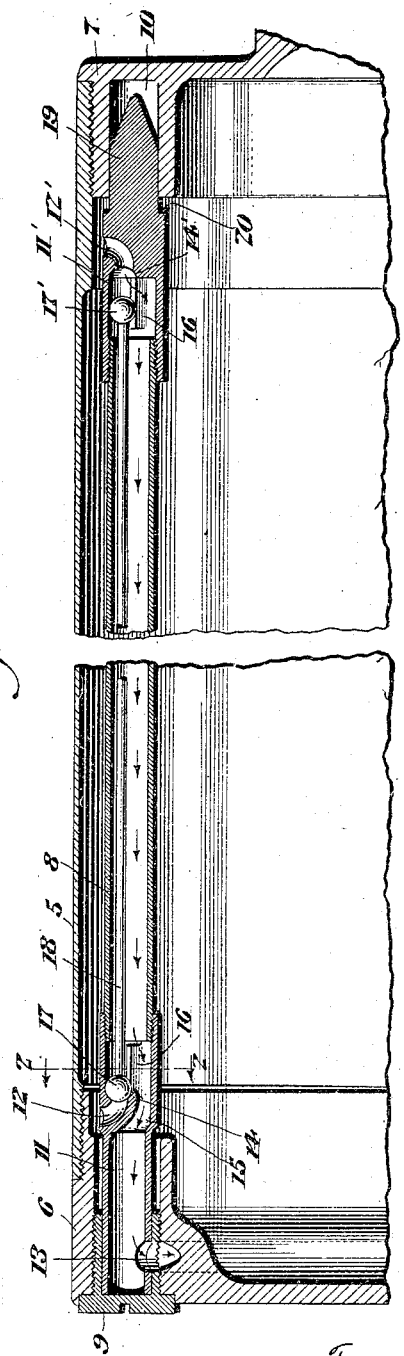
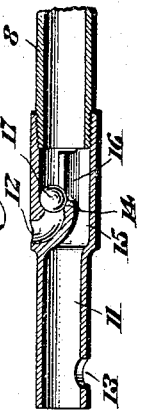
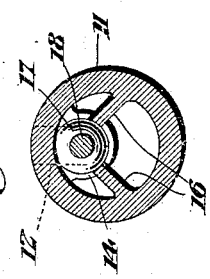
Inventor
Frederick D. Silloway

UNITED STATES PATENT OFFICE.

FREDERICK D. SILLOWAY, OF SPRINGFIELD, ILLINOIS.

STEAM-ESCAPE FIXTURE FOR MACHINE-GUN WATER-JACKETS.

1,294,349. Specification of Letters Patent. Patented Feb. 11, 1919.

Application filed December 21, 1918. Serial No. 267,872.

(FILED UNDER THE ACT OF MARCH 3, 1883, 22 STAT. L., 625.)

*To all whom it may concern:*

Be it known that I, FREDERICK D. SILLOWAY, a citizen of the United States, a resident of Springfield, Illinois, and stationed at Washington, District of Columbia, have invented an Improvement in Steam-Escape Fixtures for Machine-Gun Water-Jackets, of which the following is a specification.

The invention described herein may be used by the Government, or any of its officers or employees in prosecution of work for the Government, or by any other person in the United States, without payment of any royalty thereon.

This invention relates to devices for releasing the steam generated within the water jacket of a machine gun and refers more particularly to automatic steam fixtures therefor.

It is usual to provide a water jacket about a machine gun barrel and to provide therein a longitudinally extending steam escape tube positioned adjacent the uppermost portion of the jacket. This tube is perforated on its upper side adjacent each end and has connection at the front end with an outlet pipe. When water is introduced into the jacket, said perforations in the tube establish the water level within the jacket in a well known and obvious manner. When the gun is elevated or depressed at its forward end, the water will remain level and one of said perforations in the steam tube will be submersed, whereupon it will be readily seen that the water from the jacket would normally escape through the outlet pipe.

In order to close the submerged perforation in the steam tube, thus to prevent the escape of water from the jacket, and to allow the other of said perforations to remain open to provide a steam outlet from the jacket, a steam escape mechanism is provided to control the ports in said tube.

The principal object of this invention is to provide a simple and effective device of the foregoing character by means of which the ports of the steam tube in a machine gun jacket may be automatically controlled, so that the lowermost of said ports will be closed and the uppermost opened simultaneously upon the change of position of the machine gun with respect to the water level within the jacket.

With the foregoing objects in view, together with other important objects to be referred to herein, my invention comprises the new and useful details of construction and arrangement, which will be hereinafter fully described, illustrated in the annexed drawings, and pointed out more specifically in the appended claims.

In the accompanying drawings, wherein the preferred embodiment of my invention is illustrated, like reference characters refer to like or corresponding parts throughout the several views.

Figure 1 is a vertical fragmentary section of a machine gun jacket showing the steam escape device of my invention in place therein.

Fig. 2 is a cross section of the steam tube front fixture of my invention.

Fig. 3 is a longitudinal section of my steam tube front fixture, illustrating a modified form of embodiment.

Referring now to the drawings, the cylindrical jacket about the gun barrel of the machine gun is designated by numeral 5, the forward end being closed by the end cap 6 and the rear end by the trunnion block 7.

The steam escape unit comprises the steam tube 8 to which is attached at its forward end the steam tube front fixture 11 and at its rear end the steam tube rear fixture 11'. Fixture 11 is pressed into the steam tube front plug 9, the end cap 6 being perforated and threaded to receive the plug. The rear fixture 11' is provided with tapered rear plug 19 adapted to enter a recessed supporting boss 10 on the forward face of the trunnion block positioned to center steam tube in alinement with the perforation in the end cap, shoulder 20 being provided to limit the travel of the plug into recessed boss 10, upon assembly. A perforation 13 is provided through the walls of fixture 11 and front plug 9 in position to register with the steam outlet opening in the end caps.

Fixture 11 is provided with a steam escape port and passage 12 leading from the upper side of the fixture to the interior thereof and a seat 14 is provided at the inner end of said passage. A ball valve 17 is adapted to seat on said valve seat, the valve being adapted to move longitudinally of the fixture upon ribs 16 fixed radially of the valve seat. The passage longitudinally through the fixture is designated by numeral 15 and extends around and below the valve seat between the aforesaid ribs 16.

The rear fixture 11' is provided with a steam inlet port and passage 12' leading to the valve seat 14' and a ball valve 17' is adapted to engage said seat and to move longitudinally of said fixture on ribs 16, as previously described with respect to fixture 11.

It will be readily seen that when the forward end of the machine gun is elevated, port 12' will become submersed in the water within the jacket. Upon this tilted condition of the gun and steam tube, ball 17 will move rearwardly on the ribs 16 and become unseated from the valve seat 14, thus opening port 12. Likewise, ball 17' will move rearwardly and engage seat 14' of the fixture 11', thus closing port 12'. Port 12' thus being closed, water within the jacket will be prevented from entering the steam tube, while port 12 being open and above the water level, steam may enter the tube therethrough and thus be conducted to the steam outlet through opening 13.

It will likewise be apparent that as the rear of the gun is elevated above the forward end, balls 17 and 17' will move forward, closing the forward port 12 and opening the rear port 12', thus allowing the escape of steam through port 12', tube 8 and passage 15 in fixture 11 to the escape pipe in the end cap.

In order to insure instant action of the valves and also to insure the effective coaction thereof, I provide a connecting rod 18 to be fixed to each of said ball valves. The added weight of the rod will insure the instant action of the valves upon the shifting of the gun, and insure the simultaneous opening of one valve upon the closing of the other, thus to prevent accident should the valves fail to respond in unison.

In Fig. 3, I have illustrated my device without the incorporation therewith of the connecting rod, the travel of the ball 17 from its seat 14 being limited by engagement of the ball with the end of steam tube 8.

From the foregoing description, it will be seen that my device provides a simple and effective means for automatically opening and closing the ports in a steam escape tube for a machine gun, so that the lowermost of said ports will be closed and the uppermost opened upon the change of elevation of the gun.

Having thus described my invention, what I claim as new and desire to protect by Letters Patent is:—

1. A steam escape tube for machine gun water jackets comprising spaced-apart inlet ports having valve seats on the interior of the tube, and valves positioned to gravitate toward and from said seats to simultaneously open the uppermost of said ports and close the lowermost thereof upon the change of level of the gun.

2. A steam escape tube for machine gun water jackets comprising spaced-apart inlet ports having valve seats on the interior of the tube, and a valve rod adapted to gravitate longitudinally of the tube and having a valve on each end in position to simultaneously open the uppermost of said ports and close the lowermost thereof upon the change of level of the gun.

3. A steam escape device for machine gun water jackets comprising a steam tube unit extending longitudinally within the jacket and leading to an outlet pipe, an inlet port adjacent each end of said unit leading to the interior thereof, valve seats on the inner ends of said ports, and valves positioned to gravitate toward and from said seats to simultaneously open the uppermost of said ports and close the lowermost thereof upon the change of level of the gun.

4. A steam escape device for machine gun water jackets comprising a steam tube unit extending longitudinally within the jacket and leading to an outlet pipe, an inlet port adjacent each end of said unit leading to the interior thereof, valve seats on the inner ends of said ports, and ball valves positioned to gravitate toward and from said seats to simultaneously open the uppermost of said ports and close the lowermost thereof upon change of level of the gun.

5. A steam escape device for machine gun water jackets comprising a steam tube unit extending longitudinally within the jacket and leading to an outlet pipe, an inlet port adjacent each end of said unit leading to the interior thereof, valve seats on the inner ends of said ports, and a valve rod adapted to gravitate longitudinally of the tube unit and comprising a valve on each end positioned to simultaneously open the uppermost of said ports and close the lowermost thereof upon the change of level of the gun.

6. A steam escape device for machine gun water jackets comprising spaced-apart inlet fixtures having valve seats, a pipe connecting said fixtures, one of said fixtures having an outlet connection for steam, and valves positioned to gravitate toward and from said seats to simultaneously uncover the uppermost of said seats and close the lowermost thereof upon the change of level of the gun.

7. A steam tube for machine gun water jackets comprising spaced-apart inlet fixtures having valve seats, a pipe connecting said fixtures, one of said fixtures having an outlet connecting with the steam outlet pipe from the jacket, and a valve rod adapted to gravitate longitudinally within the pipe and comprising a valve on each end in position to simultaneously open the uppermost of said inlet valve seats and close the lowermost thereof upon the change of level of the gun.

FREDERICK D. SILLOWAY.

Copies of this patent may be obtained for five cents each, by addressing the "Commissioner of Patents, Washington, D. C."